Oct. 20, 1953 E. R. BERGMANN 2,656,037
DRIVE MECHANISM FOR SHAKER CONVEYERS
Filed June 4, 1951
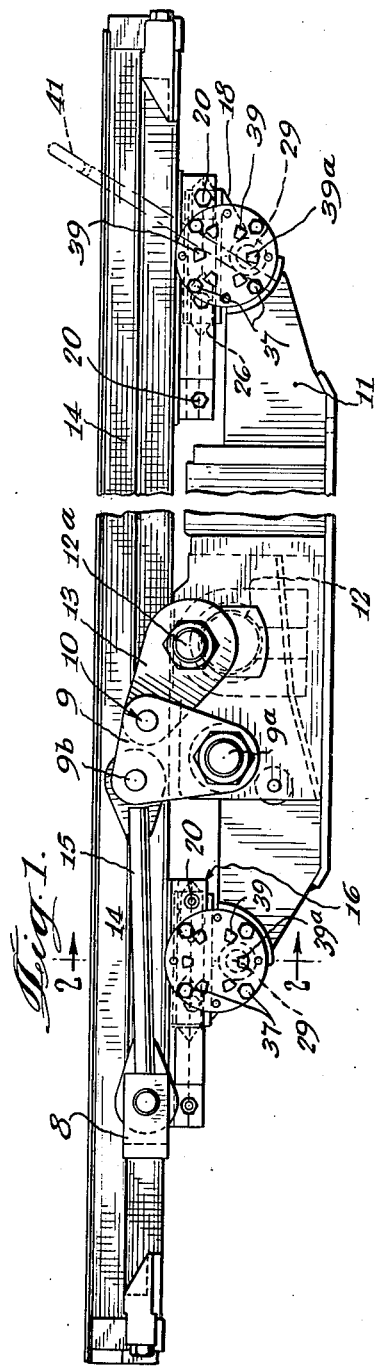
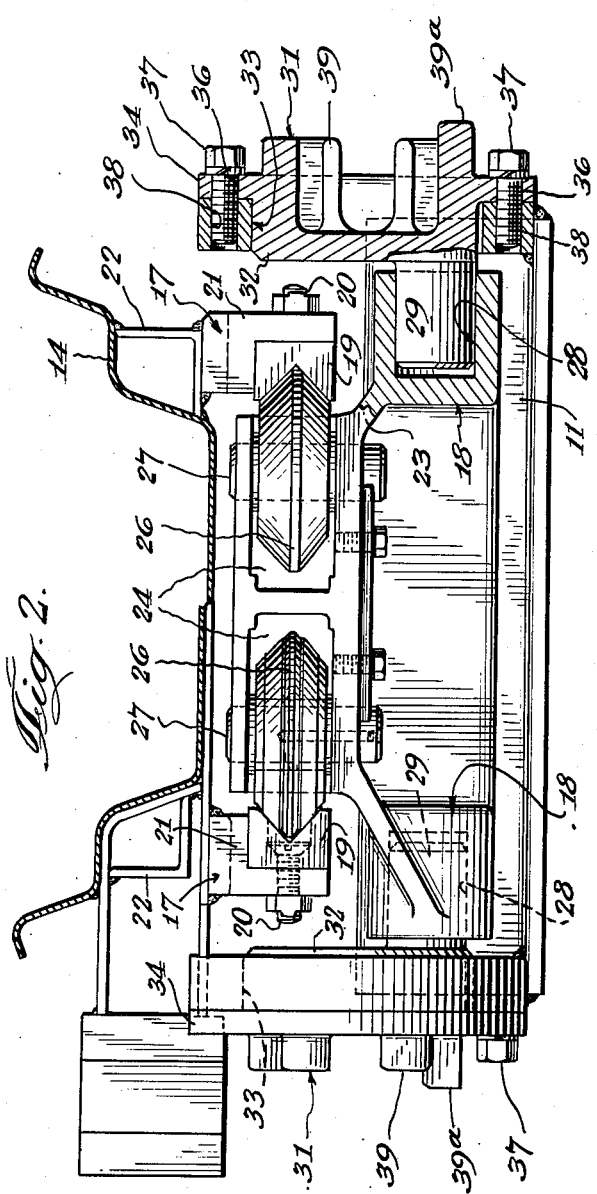

Patented Oct. 20, 1953

2,656,037

UNITED STATES PATENT OFFICE 2,656,037

DRIVE MECHANISM FOR SHAKER CONVEYERS

Ernst R. Bergmann, Evergreen Park, Ill., assignor to Goodman Manufacturing Company, Chicago, Ill., a corporation of Illinois Application June 4, 1951, Serial No. 229,812

5 Claims. (Cl. 198—220)

This invention relates to improvements in drive mechanisms for shaker conveyors and more particularly relates to improvements in supporting means for a driving trough of a shaker conveyor trough line on the conveyor drive mechanism.

Heretofore, as shown for example in applicant's Patent No. 2,284,718, the driving trough of a shaker conveyor trough line has been supported at opposite ends on brackets attached to the main frame by bolts engaged in a pair of a plurality of vertically aligned bolt holes. Changing the adjusted height or inclination of the driving trough involved entirely removing one or both of the brackets and reassembling at another adjusted height, using another pair of bolt holes if necessary. A jack had to be used to support the trough while the bracket was off and had to be used to elevate or lower the trough. Furthermore, at least two men were necessary to make the adjustment.

By the present invention, a single man can change the adjusted height of the trough and the need for a jack to support the trough during adjustment is eliminated.

Briefly, by the present invention the roller or ball frames which conventionally support the opposite ends of the driving trough are each, in turn, pivotally supported, eccentrically between pairs of adjusting members which are rotatably journaled about a transverse axis on the main frame. A series of circularly arranged bolts connected between each adjusting member and the main frame provides for a number of adjusted heights and adjusted inclinations of the driving trough. And circularly spaced lugs on each adjusting member facilitates turning by a bar to shift the trough between adjusted positions. The fact that the adjusting member may remain engaged within a bore in the main frame, or vice versa, together with the provision of the turning lugs, renders use of a jack and a second man unnecessary.

Other objects and advantages of the present invention will be seen in the following description taken in connection with the drawings in which:

Figure 1 is a view in side elevation of a shaker conveyor drive mechanism having a driving trough of a shaker conveyor trough line mounted thereon in accordance with the present invention, with certain parts of the drive mechanism broken away and certain other parts shown in section, in order to more clearly illustrate certain details of the invention; and Fig. 2 is a vertical cross sectional view of Fig. 1, taken along the line 2—2.

Referring now more particularly to the drawing, a shaker conveyor drive mechanism, generally indicated by reference character 10, is provided. This drive mechanism may be of any type and is herein shown as including a main frame 11 having a transverse crank shaft 12 extending out of one side as shown. The crank shaft has a crank pin 12a to which is attached a connecting rod or link 13, the latter being pivotally mounted, as at 16, to a bell crank 9 which is fixed on another transverse shaft 9a for oscillatory movement. A pulier rod or link 15 is pivotally connected respectively at its ends to a pin 9b carried by the bell crank and to a bracket 8 carried by the driving trough 14 in the usual manner. Thus, it will be understood that when the crank shaft 12 is rotatably driven, the driving trough 14 will be oscillated in a material-moving manner in the usual way.

If desired, for the purpose of applying driving forces to both sides of the driving trough 14, the rock shaft 9a may extend out of the far side of the frame as seen in Fig. 1, and to it may be connected a lever corresponding to the bell crank 9 and another puller rod corresponding to that numbered 15.

Each end of the driving trough is reciprocably guided relative to the main frame by a roller frame generally designated 16. As shown in Fig. 2 each roller frame includes an upper section 17 which is reciprocable with the driving trough 14 and a lower section 18 which is pivotally mounted on the main frame.

Each upper section 17 includes a pair of transversely spaced longitudinal V-blocks 19, 19 mounted at intervals by bolts 20 to blocks 21 welded onto the corresponding supporting angle 22 on each side of the trough.

The lower section 18 comprises a casting 23 having two pairs of spaces 24, 24 within which rollers 26, 26 are journaled about vertical pins 27, 27. The rollers engage with the V-blocks 19 to maintain the driving trough guided in a straight reciprocable path. At each side the casting 23 has a transverse bore 28 within which is journaled an eccentric transverse extension 29 of an adjusting member 31.

The adjusting member, in this case, comprises a generally circular body having a portion 32 rotatably journaled within a cylindrical bore 33 formed in a corresponding part of the housing. Each adjusting member has a flange 34 with a plurality (in this case eight) of circularly arranged bolt holes 36. A plurality (in this case four) of bolts 37 are provided for alternate ones of the bolt holes 36 and are assembled into tapped openings 38 in the main frame.

With the arrangement just described in which each roller frame 16 is pivotally supported between axially aligned pairs of eccentrically mounted pivots 29, 29 on adjusting members 31, it will be seen that, even with the bolts 37 removed, the driving trough will remain supported without the aid of the jacks heretofore used.

To further render the use of jacks unnecessary, in shifting the driving trough between one adjusted height or inclination to another, each adjusting member 31 is provided with a plurality (in this case six) of circularly arranged, outwardly extending lugs 39, 39a, between which a bar 41 (Fig. 1) may be placed to forcibly rotate the adjusting member and shift the corresponding end of the driving trough up or down. On each adjusting member the five lugs 39 are identical, but the lug 39a which is in line with the eccentric extension 29 is enlarged (Fig. 2) to provide a ready, visual indication of the adjusted height of the driving trough. Thus, with no more than a quick glance at the positions of each of the lugs 39a, the operator will know the condition of each of the adjusting members 31.

In adjusting the height of one end of the driving trough, all of the bolts 37 in both of the corresponding adjusting members 31 will be removed. As shown in the drawing the eccentric pivot pins 29 are in their lowest positions. The adjusting members may be rotated 180 degrees to shift them to their highest positions. And, with the particular bolt hole spacing shown, two more intermediate positions are available. Additional intermediate adjusted positions may be obtained, of course, by increasing the number of bolt holes 38. The length of the V-blocks 19 should be made sufficient to accommodate the normal reciprocal range of the driving trough, and, additionally, the longitudinal shifting of the lower roller section 18 due to the arcuate path of movement of the pins 29.

In aligning the driving trough 14 with an inclined shaker trough line it is often necessary to tilt it substantially and this may be done merely by rotating the adjusting members at one end and tilting the driving trough assembly about the pivot pins 29 at the opposite end. In extreme conditions of inclination the pins 29 at one end will be in their maximum height condition while the pins at the opposite end will be at their lowest positions.

Thus, it will be seen that the adjusting members 31 of the present invention serve three purposes: first, they lift or lower both ends of the trough to adjust its height; second, they lift or lower one end relative to the other to adjust its inclination while at the same time serving as a pivot about which the other end tilts; and third, they function as jacks to lift or lower the trough when an ordinary bar such as designated 41 is applied thereto.

While one form in which the present invention may be embodied has been shown and described it will be understood that various modifications and variations thereof may be effected without departing from the spirit and scope of the invention as defined by the appended claims.

I claim:

1. In a support for a driving trough section of a shaker conveyor and in combination with a shaker conveyor drive mechanism having a main frame, drive means connecting said drive mechanism with said driving trough section for reciprocably driving said trough section, means for adjustably supporting said driving trough section on opposite ends of said main frame to conform to the inclination and height of the conveyor trough line and for reciprocably guiding and holding said driving trough section from lateral and vertical displacement in all positions of adjustment of said trough section with respect to said main frame including a pair of roller frames each being mounted between transversely spaced adjusting members and pivoted, about a transverse axis, to an eccentric portion of each adjusting member, each of said adjusting members having a portion thereof rotatably adjustably journaled within a transverse cylindrical bore formed in said main frame and having a flange overlapping a corresponding main frame portion, bolt means acting between each flange and its corresponding main frame portion effective to lock each adjusting member in a series of rotational adjusted positions to thereby vary the height and inclination of said driving trough, and a plurality of circularly spaced, eccentric, transversely extending lugs on each adjusting member for engaging a bar to facilitate adjustment.

2. In a support for a driving trough section of a shaker conveyor and in combination with a shaker conveyor drive mechanism having a main frame, drive means connecting said drive mechanism with said drive trough section for reciprocably driving said trough section, means for adjustably supporting said driving trough section on opposite ends of said main frame to conform to the inclination and height of the conveyor trough line and for reciprocably guiding and holding said driving trough section from lateral and vertical displacement in all positions of adjustment of said trough section with respect to said main frame including a pair of roller frames each being mounted between transversely spaced adjusting members and pivoted to an eccentric portion of each adjusting member, each pair of adjusting members being mounted in coaxial bores formed in said main frame for rotational movement therein and bolt means acting between each adjusting member and the main frame for locking the adjusting member in a series of rotational positions to adjust the supported height and inclination of said driving trough section.

3. In a support for a driving trough section of a shaker conveyor and in combination with a shaker conveyor drive mechanism having a main frame, drive means connecting said drive mechanism with said drive trough section for reciprocably driving said trough section, means for adjustably supporting said driving trough section on opposite ends of said main frame to conform to the inclination and height of the conveyor trough line and for reciprocably guiding and holding said driving trough section from lateral and vertical displacement in all positions of adjustment of said trough section with respect to said main frame including a pair of roller frames each being transversely pivoted to an eccentric portion of at least one adjusting member which is mounted on the main frame for rotational adjustment about a transverse axis, and bolt means acting between said adjusting member and the main frame for locking the adjusting member in a series of rotational adjusted positions for adjusting the supported height and inclination of said driving trough section.

4. In a support for a driving trough section of a shaker conveyor and in combination with a shaker conveyor drive mechanism having a main frame, drive means connecting said drive mechanism with said driving trough section for reciprocably driving said trough section, means for adjustably supporting said driving trough section on opposite ends of said main frame to conform to the inclination of the conveyor trough line and for reciprocably guiding and holding said driving trough section from lateral displacement in all positions of adjustment of said trough section with respect to said main frame including at least one roller frame supporting said driving trough section and at least one adjusting member between said frames, said adjusting member being rotatably journaled in a transverse cylindrical bore formed in one of said frames, the other of said frames being pivoted, about a transverse axis, to an eccentric portion of said adjusting means, and bolt means acting between one of frames and said adjusting member for locking the latter in a series of rotational positions to thereby vary the inclination of said driving trough, and wrench-engaging formations on said adjusting member to facilitate adjustment.

5. In a support for a driving trough section of a shaker conveyor and in combination with a shaker conveyor drive mechanism having a main frame, drive means connecting said drive mechanism with said driving trough section for reciprocably driving said trough section, means for adjustably supporting said driving trough section on opposite ends of said main frame to conform to the inclination of the conveyor trough line and for reciprocably guiding and holding said driving trough section from lateral and vertical displacement in all positions of adjustment of said trough section with respect to said main frame including at least one roller frame supporting said driving trough section and at least one adjusting member between said frames, said adjusting member being rotatably journaled in a transverse cylindrical bore formed in one of said frames, the other of said frames being pivoted, about a transverse axis, to an eccentric portion of said adjusting member, said adjusting member having a portion overlapping a corresponding frame portion, and bolt means acting between the lapping portions for locking the adjusting member in a series of rotational positions to thereby vary the inclination of said driving trough, and wrench-engaging formations on said adjusting member to facilitate adjustment.

ERNST R. BERGMANN.

References Cited in the file of this patent

UNITED STATES PATENTS

| Number | Name | Date |
|---|---|---|
| 1,338,382 | Lewis | Apr. 27, 1920 |
| 1,549,152 | Rueff | Aug. 11, 1925 |
| 2,284,718 | Bergmann | June 2, 1942 |

FOREIGN PATENTS

| Number | Country | Date |
|---|---|---|
| 806 | Great Britain | Nov. 23, 1901 |